United States Patent
Nomura et al.

(10) Patent No.: US 12,406,785 B2
(45) Date of Patent: Sep. 2, 2025

(54) ANISOTROPIC RARE EARTH SINTERED MAGNET AND METHOD FOR PRODUCING THE SAME

(71) Applicant: SHIN-ETSU CHEMICAL CO., LTD., Tokyo (JP)

(72) Inventors: Tadao Nomura, Fukui (JP); Kazuki Otsuka, Echizen (JP); Masayuki Kamata, Tsuruga (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 10 days.

(21) Appl. No.: 17/733,191

(22) Filed: Apr. 29, 2022

(65) Prior Publication Data

US 2022/0367092 A1   Nov. 17, 2022

(30) Foreign Application Priority Data

May 17, 2021 (JP) .................. 2021-082977

(51) Int. Cl.

| | | |
|---|---|---|
| H01F 1/059 | (2006.01) | |
| B22F 3/16 | (2006.01) | |
| B22F 3/24 | (2006.01) | |
| C01B 32/907 | (2017.01) | |
| C22C 38/10 | (2006.01) | |
| C22C 38/12 | (2006.01) | |
| C22C 38/14 | (2006.01) | |
| C22C 38/16 | (2006.01) | |
| C22C 38/20 | (2006.01) | |
| C22C 38/22 | (2006.01) | |
| C22C 38/24 | (2006.01) | |
| C22C 38/26 | (2006.01) | |

(Continued)

(52) U.S. Cl.
CPC ............. *H01F 1/0593* (2013.01); *B22F 3/16* (2013.01); *B22F 3/24* (2013.01); *C01B 32/907* (2017.08); *C22C 38/10* (2013.01); *C22C 38/105* (2013.01); *C22C 38/12* (2013.01); *C22C 38/14* (2013.01); *C22C 38/16* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/40* (2013.01); *C22C 38/44* (2013.01); *C22C 38/46* (2013.01); *C22C 38/48* (2013.01); *C22C 38/50* (2013.01); *C22C 38/52* (2013.01); *H01F 1/0536* (2013.01); *H01F 1/0557* (2013.01); *H01F 1/086* (2013.01); *H01F 41/0266* (2013.01); *H01F 41/0273* (2013.01); *B22F 2003/248* (2013.01); *B22F 2202/05* (2013.01); *C01P 2006/42* (2013.01)

(58) Field of Classification Search
CPC ............. H01F 1/055–0557; H01F 1/0593
See application file for complete search history.

(56) References Cited

U.S. PATENT DOCUMENTS

| | | |
|---|---|---|
| 2006/0169360 A1 | 8/2006 | Sakamoto et al. |
| 2015/0262740 A1 | 9/2015 | Fujiwara et al. |

(Continued)

FOREIGN PATENT DOCUMENTS

| | | |
|---|---|---|
| EP | 1 589 544 A1 | 10/2005 |
| JP | 4-280403 A | 10/1992 |

(Continued)

OTHER PUBLICATIONS

Otuska K., et al.; Coercivities of Sm—Fe-M Sintered Magnets with ThMn12 Type Structure (M-Ti,V); Material Transactions; vol. 62, No. 6. 2021; pp. 887-891 (Year: 2021).*

Extended European Search Report issued Oct. 21, 2022, in European Patent Application No. 22170310.1, 8 pages.

Ohashi et al., "Magnetic Properties of Intermetallic Compounds R-Ti—Fe", The Institute of Electrical Engineers of Japan, Magnetics Research Society, MAG-87-120, 1987, 8 pages.

(Continued)

*Primary Examiner* — Sally A Merkling
*Assistant Examiner* — Austin Pollock
(74) *Attorney, Agent, or Firm* — Oblon, McClelland, Maier & Neustadt, L.L.P.

(57) ABSTRACT

Provided are an anisotropic rare earth sintered magnet having a $ThMn_{12}$-type crystal compound as a main phase and exhibits good magnetic characteristics, and a method for producing it. The anisotropic rare earth sintered magnet has a composition of a formula $(R_{1-a}Zr_a)_v(Fe_{1-b}Co_b)_{100-v-w-x-y}(M^1_{1-c}M^2_c)_wO_xC_y$, (where R is one or more kinds selected from rare earth elements and indispensably includes Sm, $M^1$ is one or more kinds of elements selected from the group consisting of V, Cr, Mn, Ni, Cu, Zn, Ga, Al, and Si, $M^2$ is one or more kinds of elements selected from the group consisting of Ti, Nb, Mo, Hf, Ta, and W, and v, w, x, y, a, b, and c each satisfy $7 \leq v \leq 15$ at %, $4 \leq w \leq 20$ at %, $0.2 \leq x \leq 4$ at %, $0.2 \leq y \leq 2$ at %, $0 \leq a \leq 0.2$, $0 \leq b \leq 0.5$, and $0 \leq c \leq 0.9$), which contains a main phase of a $ThMn_{12}$-type crystal compound in an amount of 80% by volume or more with the average crystal particle diameter of the main phase being 1 μm or more, which contains an R oxycarbide in the grain boundary area, and which has a density of 7.3 g/cm³ or more. The production method for the anisotropic rare earth sintered magnet includes grinding an alloy that contains a $ThMn_{12}$-type crystal compound phase but does not contain an oxycarbide, then molding it in a mode of pressure powder molding with magnetic field application thereto to give a molded article, and thereafter sintering it at a temperature of 800° C. or higher and 1400° C. or lower to form an oxycarbide in the grain boundary area.

12 Claims, No Drawings

(51) Int. Cl.
*C22C 38/28* (2006.01)
*C22C 38/30* (2006.01)
*C22C 38/40* (2006.01)
*C22C 38/44* (2006.01)
*C22C 38/46* (2006.01)
*C22C 38/48* (2006.01)
*C22C 38/50* (2006.01)
*C22C 38/52* (2006.01)
*H01F 1/053* (2006.01)
*H01F 1/055* (2006.01)
*H01F 1/08* (2006.01)
*H01F 41/02* (2006.01)

(56) References Cited

U.S. PATENT DOCUMENTS

| | | |
|---|---|---|
| 2015/0380134 A1 | 12/2015 | Machida et al. |
| 2021/0043344 A1* | 2/2021 | Tomita ............... B22F 3/00 |

FOREIGN PATENT DOCUMENTS

| | | | |
|---|---|---|---|
| JP | 04-308062 | A | 10/1992 |
| JP | 4-317304 | A | 11/1992 |
| JP | 05-11 4507 | A | 5/1993 |
| JP | 2000-114017 | A | 4/2000 |
| JP | 2001-189206 | A | 7/2001 |
| JP | 2005-194592 | A | 7/2005 |
| JP | 2017-112300 | A | 6/2017 |
| JP | WO 2016/162990 | A1 | 8/2017 |
| JP | 2018103211 | A * | 7/2018 |
| JP | 2018-125512 | A | 8/2018 |
| JP | 2019-44259 | A | 3/2019 |
| JP | 2020136333 | A * | 8/2020 |
| JP | 2020136334 | A * | 8/2020 |
| JP | 2021-52052 | A | 4/2021 |
| JP | 2021052052 | A * | 4/2021 |
| KR | 10-2016-0030366 | A | 3/2016 |

OTHER PUBLICATIONS

Japanese Office Action issued Dec. 19, 2023 in Japanese Application 2021-082977, 4 pages.

* cited by examiner

ANISOTROPIC RARE EARTH SINTERED MAGNET AND METHOD FOR PRODUCING THE SAME

FIELD OF THE INVENTION

The present invention relates to an anisotropic rare earth sintered magnet having a ThMn$_{12}$-type crystal compound as a main phase, and a method for producing the same.

BACKGROUND OF THE INVENTION

A rare earth magnet, especially an Nd—Fe—B sintered magnet is expected to have an increasing demand in the future with the background of electrification of automobiles, and enhancement of performance and power saving of industrial motors, and are expected to further increase in production volume. On the other hand, there is a concern that supply and demand balance of rare earth materials will be lost in the future, and therefore in recent years, research on the reduction of rare earth in rare earth magnets has attracted attention. Above all, a compound having a ThMn$_{12}$-type crystal structure has a smaller rare earth content than an R$_2$Fe$_{14}$B compound and has better magnetic characteristics, and is therefore actively studied as a next-generation magnet material. It is known that, when an element such as nitrogen or carbon is infiltrated into a ThMn$_{12}$-type compound, the magnetization and the Curie temperature thereof increase and the crystal magnetic anisotropy thereof greatly changes.

For example, PTL 1 discloses a rare earth permanent magnet produced by finely pulverizing a rare earth magnet alloy composed of R[(Fe$_{1-X}$Co$_X$)$_{1-Y}$M$_Y$]$_Z$A$_W$ (where R is one kind or two or more kinds of rare earth elements, M is one kind or two or more kinds of elements selected from Ti, V, Cr, Mn, Mo, W, Nb, Ta, Si, and Al, A is one or more kinds of C or N, 0≤X≤0.5, 0.01≤Y≤0.3, 10≤Z≤13, 0.1≤W≤2) in which the main phase has a ThMn$_{12}$ structure and has an interlattice intruding atom, then molding it in a mode of magnetic field orientation forming, and sintering and aging it.

PTL 2 discloses a permanent magnet having a composition of R$_a$TM$_b$M$_c$AD$_d$C$_e$ (where R is at least one kind of rare earth elements including Y, TM is at least one of Fe, Co and Ni, M is at least one kinds of Si, Ti, V, Cr, Mo, and W, AD is at least one kind of Al, Mn, Zn, Cu, Ga, Ge, Zr, Nb, Sn, Sb, Hf, and Ta, and 5≤a≤18 at %, 65≤b≤85 at %, 3≤c≤20 at %, 0≤d≤8 at %, 2≤e≤15 at %). Here, this discloses that C (carbon) has intruded into a ThMn$_{12}$-type crystal structure as an interstitial type to improve saturation magnetization, anisotropy field and Curie temperature.

PTL 3 discloses a permanent magnet produced by molding in a magnetic field an alloy having a composition of (R$_{1-u}$M$_u$)(Fe$_{1-v-w}$Co$_v$T$_w$)$_x$A$_y$X$_z$ (R: at least one element selected from rare earth elements including Y, M: at least one element selected from Ti and Nb, T: at least one element selected from Ni, Cu, Sn, V, Ta, Cr, Mo, W, and Mn, A: at least one element selected from Si, Ge, Al, and Ga, X: at least one element selected from C, N, O, B, S, and P, 0.1≤u≤0.7, 0≤v≤0.8, 0≤w≤0.1, 5≤x≤12, 0.1≤y≤1.5, 0≤z≤3), in which the main hard magnetic phase is a ThMn$_{12}$-type crystal structure, and sintering it. Here, this discloses that the element X exists in the interstitial site of the ThMn$_{12}$-type crystal structure to improve the Curie temperature and the magnetic anisotropy of the main phase.

PTL 4 discloses an alloy having a composition of [R$_{1-a}$(M1)$_a$][T$_{1-b-c}$(M2)$_b$(M3)$_c$]$_d$X$_\alpha$A$_\beta$ (R: at least one kind of rare earth elements (including Y), M1: at least one kind selected from Zr and Hf, T: at least one kind selected from Fe, Co and Ni, M2: at least one kind selected from Cu, Bi, Sn, Mg, In and Pb, M3: at least one kind selected from Al, Ga, Ge, Zn, B, P and S, X: at least one kind selected from Si, Ti, y Cr, Mn, Nb, Mo, Ta and W, A: at least one kind selected from N, C and H, 0≤a≤0.6, 0.01≤b≤0.20, 0≤c≤0.05, 7≤d≤11, 0.5≤α≤2.0, 0<β<≤2.0), and containing a ThMn$_{12}$-type hard magnetic phase and a nonmagnetic phase having a low melting point. Here, the nonmagnetic phase is formed of a formula R$_a$M$_b$T$_c$X$_d$O$_e$ (R: at least one kind of rare earth elements (including Y), M: at least one kind selected from Cu, Si, Bi, Sn, Mg, Pb and In, T: at least one kind selected from Fe, Co, Ni, Mn, Al, Ga, Ge, Ti, Zr, Hf, Ta, V, Nb, Cr, Mo, W and Zn, X: at least one kind selected from B, C, P, S, C, N and H, a+b+c+d+e=100, 1≤a≤60, 1≤b≤90, 0≤c≤50, 0≤d≤10, 0≤e≤30), and allows inclusion of a compound based on the element X such as an oxide, a nitride or a carbide, but the element A is shown to be an element effective for improving magnetic anisotropy and improving Curie temperature by intruding essentially into the interstitial site in the main phase ThMn$_{12}$.

PTL 5 discloses a production method for a pressure-molded article of a mixture of magnetic alloy particles containing a ThMn$_{12}$-type crystal phase and C-containing particles, by heating and holding at a predetermined temperature for carburizing treatment. Here, this shows that the carburizing treatment is performed preferably in a temperature range of 350 to 700° C., and at a temperature higher than 700° C., the ThMn$_{12}$ phase may decompose.

PTL 6 shows a rare earth magnet in which the main phase has a ThMn$_{12}$-type crystal structure and the subphase contains at least any of an Sm$_5$Fe$_{17}$-type phase, an SmCo$_5$-type phase, an Sm$_2$O$_3$-type phase and an Sm$_7$C$_3$-type phase, the volume fraction of the subphase is 2.3 to 9.5%, the volume fraction of the Ct-Fe phase is 9.0% or less, and the density of the rare earth magnet is 7.0 g/cm$^3$ or more. This shows that, in production of the magnet, preferably a lubricant such as stearic acid is added before molding, and the green compact is sintered in an inert atmosphere or in vacuum at 950 to 1200° C. for 0.1 to 12 hours, or in heating, it is heated in vacuum in a temperature range of 300 to 500° C. and kept as such for 1 to 2 hours to remove the lubricant.

NPL 1 shows that, though magnetization of a composition SmTiFe$_{10}$ was tried by a powder metallurgy process, little coercive force was given thereto, and the reason would be because densification could not be attained up to around the melting point, and at a temperature over a certain point, the density increases rapidly to result in grain coarsening.

CITATION LIST

Patent Literature

[PTL 1] JP04-308062(A)
[PTL 2] JP05-114507(A)
[PTL 3] JP2000-114017(A)
[PTL 4] JP2001-189206(A)
[PTL 5] JP2005-194592(A)
[PTL 6] JP2017-112300(A)

Non-Patent Literature

[NPL 1] The Institute of Electrical Engineers of Japan, Magnetics Research Society MAG-87-120(1987).

SUMMARY OF THE INVENTION

As described in NPL 1, when a powder sintering process of grinding a raw material alloy followed by molding in a mode of magnetic field orientation forming and sintering is employed as a method for producing a sintered magnet having a ThMn$_{12}$-type compound as a main phase and containing Sm, a high sintered density is difficult to attain. A case of an insufficient sintered density leads to unfavorable phenomena such as failure in attaining good magnetic characteristics, large fluctuation of magnetic characteristics and occurrence of temporal degradation. Accordingly it was a problem in this magnet to stably attain a high sintered density of 95% or more (for example, a sintered density of 7.3 g/cm$^3$ or more) by the powder sintering process.

The present invention has been made in consideration of the above-mentioned problem, and its object is to provide a sintered magnet having a ThMn$_{12}$-type crystal compound as a main phase and containing Sm in the composition thereof, and having a sufficient sintered density.

The present inventors have repeated assiduous studies for attaining the above-mentioned object and, as a result, have found that an anisotropic rare earth sintered magnet containing a ThMn$_{12}$-type crystal compound as a main phase and containing Sm can have a high sintered density when an Sm-containing oxycarbide is formed in the sintering process for the magnet, and have completed the present invention.

Accordingly the present invention provides an anisotropic rare earth sintered magnet and a method for producing the same mentioned below.

(1) An anisotropic rare earth sintered magnet having a composition of a formula $(R_{1-a}Zr_a)_v(Fe_{1-b}Co_b)_{100-v-w-x-y}(M^1_{1-c}M^2_c)_wO_xC_y$ (where R is one or more kinds selected from rare earth elements and indispensably includes Sm, $M^1$ is one or more kinds of elements selected from the group consisting of V, Cr, Mn, Ni, Cu, Zn, Ga, Al, and Si, $M^2$ is one or more kinds of elements selected from the group consisting of Ti, Nb, Mo, Hf, Ta, and W, and v, w, x, y, a, b, and c each satisfy $7 \leq v \leq 15$ at %, $4 \leq w \leq 20$ at %, $0.2 \leq x \leq 4$ at %, $0.2 \leq y \leq 2$ at %, $0 \leq a \leq 0.2$, $0 \leq b \leq 0.5$, and $0 \leq c \leq 0.9$), which contains a main phase of a ThMn$_{12}$-type crystal compound in an amount of 80% by volume or more with the average crystal particle diameter of the main phase being 1 µm or more, which contains an R oxycarbide in the grain boundary area, and which has a density of 7.3 g/cm$^3$ or more.

(2) The anisotropic rare earth sintered magnet according to (1), wherein the oxycarbide is an oxycarbide of one or more kinds selected from the group consisting of an R(C,O) phase, an R(C,O)$_2$ phase, and an R$_2$(C,O)$_3$ phase.

(3) The anisotropic rare earth sintered magnet according to (1) or (2), which contains the oxycarbide in an amount of 1% by volume or more.

(4) The anisotropic rare earth sintered magnet according to any of (1) to (3), wherein in the composition of the sintered body, the proportion of Sm in R is 0.05 or more as an atomic ratio.

(5) The anisotropic rare earth sintered magnet according to any of (1) to (4), which contains an R-rich phase and an R(Fe,Co)$_2$ phase in the grain boundary area, and in which the total amount of formation of the R-rich phase and the R(Fe,Co)$_2$ phase is 1% by volume or more.

(6) The anisotropic rare earth sintered magnet according to (5), wherein the R(Fe,Co)$_2$ phase is a phase showing ferromagneticity or ferrimagneticity at room temperature or higher.

(7) The anisotropic rare earth sintered magnet according to any of (1) to (6), wherein a two-intergranular grain boundary phase is formed between neighboring main phase grains.

(8) The anisotropic rare earth sintered magnet according to any of (1) to (7), which shows a coercive force of 5 kOe or more at room temperature and in which the temperature coefficient β of the coercive force is −0.5%/K or more.

(9) A method for producing an anisotropic rare earth sintered magnet of any of (1) to (8), including grinding an alloy that contains a ThMn$_{12}$-type crystal compound phase but does not contain an oxycarbide, then molding it in a mode of pressure powder molding with magnetic field application thereto to give a molded article, and thereafter sintering it at a temperature of 800° C. or higher and 1400° C. or lower to form an oxycarbide in the grain boundary area.

(10) The method for producing an anisotropic rare earth sintered magnet according to (9), including heat treatment at a temperature of 300 to 900° C. after the sintering.

DETAILED DESCRIPTION OF THE INVENTION

According to the present invention, there can be provided an anisotropic rare earth sintered magnet having a ThMn$_{12}$-type crystal compound as a main phase and having Sm in the composition thereof, which has a sufficient sintered density and which shows good magnetic characteristics.

DESCRIPTION OF EMBODIMENTS

Embodiments of the present invention are described below. The magnet of the present invention is an anisotropic rare earth sintered magnet having a composition of the following formula: $(R_{1-a}Zr_a)_v(Fe_{1-b}Co_b)_{100-v-w-x-y}(M^1_{1-c}M^2_c)_wO_xC_y$, in which a ThMn$_{12}$-type crystal compound is a main phase, the content of the main phase of a ThMn$_{12}$-type crystal compound is 80% by volume or more, and the average crystal particle diameter of the main phase is 1 µm or more, and which contains an R oxycarbide in the grain boundary area, and which has a density of 7.3 g/cm$^3$ or more. The constituent components are first described below. v, w, x, y, a, b, and c each satisfy $7 \leq v \leq 15$ at %, $4 \leq w \leq 20$ at %, $0.2 \leq x \leq 4$ at %, $0.2 \leq y \leq 2$ at %, $0 \leq a \leq 0.2$, $0 \leq b \leq 0.5$, and $0 \leq c \leq 0.9$).

The oxycarbide is preferably an oxycarbide of one or more kinds selected from the group consisting of an R(C,O) phase, an R(C,O)$_2$ phase, and an R$_2$(C,O)$_3$ phase. Covering such a broad composition range, the anisotropic rare earth sintered magnet of the present invention is easy to produce with good reproducibility.

R is one or more kinds of elements selected from rare earth elements and indispensably includes Sm. Specifically R includes Sm indispensably and can be a combination of one or more kinds of elements selected from Sc, Y, La, Ce, Pr, Nd, Eu, Gd, Tb, Dy, Ho, Er, Tm, Yb and Lu, combined with Sm. R is an element necessary for forming a ThMn$_{12}$-type crystal structure compound of a main phase. The content of R is 7 atomic % or more and 15 atomic % or less. More preferably the content is 8 atomic % or more and 12 atomic % or less. When the content is less than 7 atomic %, an α-Fe phase precipitates and sintering is difficult, but on the other hand, when the content is more than 15 atomic %, the volume ratio of the ThMn$_{12}$-type compound phase decreases and good magnetic characteristics cannot be attained. The ThMn$_{12}$-type compound where R is Sm shows a high anisotropic magnetic field $H_A$, and therefore the anisotropic rare earth sintered magnet of the present invention indispensably has Sm. Sm contained in R is preferably 5% or more of R as an atomic ratio, more preferably 10% or more, even more preferably 20% or more, further more preferably 30% or more, further more preferably 40% or more, further more preferably 50% or more, further more preferably 60% or more, and especially preferably 65% or more. When the Sm ratio falls within the range, the effect of increasing $H_A$ can be sufficient to attain a high coercive force.

Zr substitutes for R in the $ThMn_{12}$-type compound to provide an effect of increasing the phase stability. Zr to substitute for R is 20% or less of R as an atomic ratio. When the ratio is more than 20%, $H_A$ of the $ThMn_{12}$-type compound lowers and a high coercive force is difficult to attain. In the case where a part of R is substituted with Zr, the total content of R and Zr is 7 atomic % or more and 15 atomic % or less, preferably 8 atomic % or more and 12 atomic % or less.

In order that the $ThMn_{12}$-type crystal structure can exist stably it is known that the constituent element R requires a third element M along with Fe. The third element M includes the following $M^1$ and $M^2$. In the anisotropic rare earth sintered magnet of the present invention, $M^1$ is one or more kinds of elements selected from V Cr, Mn, Ni, Cu, Zn, Ga, Al, and Si, and preferably two or more kinds of such elements. These elements play a role as a third element. $M^1$ is an element that forms a compound with R more readily than Fe, or tends to hardly bond to both Fe and R, as compared with $M^2$ that similarly acts as a third element to be mentioned below. One characteristic feature of the anisotropic rare earth sintered magnet of the present invention is that, in the magnet structure, an R-rich phase and an R(Fe, Co)$_2$ phase exist in the grain boundary area, along with the $ThMn_{12}$-type compound of the main phase, and by selecting the $M^1$ element as a third element, a structure where these three phases exist together stably can be readily formed. When both $M^1$ and $M^2$ are combined and expressed as M, $M^1$ accounts for at least 10% or more of M as an atomic ratio. More preferably it accounts for 30% or more, even more preferably 50% or more. When $M^1$ accounts for less than 10%, the R-rich phase of the above-mentioned three phases cannot be formed stably. The total of $M^1$ and $M^2$, M is 4 atomic % or more and 20 atomic % or less. When M is less than 4 atomic %, the main phase of the $ThMn_{12}$-type compound cannot be formed sufficiently but when M is more than 20 atomic %, the amount of heterophase formation increases and good magnetic characteristics cannot be attained.

$M^2$ is one or more kinds of elements selected from Ti, Nb, Mo, Hf, Ta, and W. $M^2$ also has an effect of stabilizing the $ThMn_{12}$-type crystal structure, but when too much thereof is contained, a carbide such as an $M^2C$ phase, and an $(Fe,Co)_2M^2$ phase of an $MgZn_2$-type compound precipitate inside the main phase or in the grain boundary area. In particular, the $(Fe,Co)_2M^2$ phase may become an Fe-rich composition over a stoichiometric composition to show ferromagneticity, for example, like an $Fe_2Ti$ phase, and may have some negative influences on magnetic characteristics of sintered magnets. In addition, in the case where $M^2$ alone is selected as the third element, not including $M^1$, an R-rich phase is difficult to form stably. Consequently in the case of a composition containing $M^2$, the content thereof is at most 90% or less of M as an atomic ratio.

The anisotropic rare earth sintered magnet of the present invention contains Fe as an indispensable element along with R and $M^1$. Further, a part of Fe may be substituted with Co. Substitution with Co is effective for increasing the Curie temperature $T_c$ of the main phase of the $ThMn_{12}$-type compound and increasing the saturation magnetization $M_s$. The substitution ratio with Co is 50% or less as an atomic ratio. When the substitution ratio is more than 50%, $M_s$ decreases in reverse. The total ratio of Fe and Co is the remainder of R, Zr, $M^1$, $M^2$, O and C. In addition, however, inevitable impurities that may be taken from raw materials or may be mixed in the production process, concretely H, B, F, P, S, Mg, Cl, and Ca can be contained in an amount of up to 3% by weight in total.

In the anisotropic sintered magnet of the present invention, the content of C (carbon) and O (oxygen) is controlled for the purpose of improving the densification of the sintered article. A sintered magnet containing Sm could hardly have a high density as compared with a magnet having a composition not containing Sm. This is considered to be because Sm that is an element having a high vapor pressure vaporizes in sintering, and owing to the influence, the sintering behavior may be hindered. Contrary to this, when a predetermined amount of C and O is contained, Sm bonds to C and O during sintering to form an oxycarbide, and as a result, it is considered that the amount of Sm vapor generation reduces to improve the sintering behavior, and a high sintered density of 7.3 g/cm$^3$ or more can be attained. The content of C is 0.2 atomic % or more and 2 atomic % or less, and the content of O is 0.2 atomic % or more and 4 atomic % or less. When the content of C and O is each less than 0.2 atomic %, a high sintered density could not be attained, and when the content of C is more than 2 atomic % or the content of O is more than 4 atomic %, the ratio of the main phase decreases so that the residual magnetic flux density $B_r$ lowers. The content of C is more preferably 0.25 atomic % or more and 1.5 atomic % or less, even more preferably 0.3 atomic % or more and 1 atomic % or less. The content of O is more preferably 0.3 atomic % or more and 3.5 atomic % or less, even more preferably 0.4 atomic % or more and 3 atomic % or less.

N (nitrogen) is not intentionally added to the anisotropic sintered magnet of the present invention, and the content thereof is preferably as small as possible. However, in the process of producing the sintered magnet, N may inevitably mix therein, and accordingly the upper limit thereof is, for example, 0.5 atomic %. When it is more than 0.5 atomic %, the formation amount of the R-rich phase and the R(Fe,Co)$_2$ grain boundary phase lowers and the coercive force lowers. The content of N is more preferably 0.2 atomic % or less, even more preferably 0.1 atomic % or less.

Next, the phase to constitute the anisotropic rare earth sintered magnet of the present invention is described.

The main phase in the anisotropic rare earth sintered magnet of the present invention is formed of a $ThMn_2$-type crystal structure compound, and is preferably formed of an R(Fe,Co,M)$_{12}$ compound. Preferably elements such as C, N and O that may inevitably mix in during the process of producing the sintered magnet are not contained in the main phase. However, in composition analysis with EPMA (electron probe microanalyzer), when C, N and O elements are detected owing to measurement fluctuation, observation sample preparation methods or influences of detection signals from other elements, the upper limit thereof is each preferably up to 1 atomic %, from the viewpoint of bettering $H_A$ of the main phase. The average crystal particle diameter of the main phase is 1 μm or more, and is preferably 1 μm or more and 30 μm or less. A range of 1.5 μm or more and 20 μm or less is more preferred, and a range of 2 μm or more and 10 μm or less is especially preferred. When the average crystal particle diameter is controlled to fall within the range, reduction in the residual magnetic flux density $B_r$ owing to reduction in the orientation degree of the crystal particles, or reduction in the coercive force $H_{cJ}$ can be prevented. The volume ratio of the main phase is, from the viewpoint of attaining good $B_r$ and $H_{cJ}$, 80% by volume or more of the entire magnet, preferably 80% by volume or more and less than 99% by volume, even more preferably 90% by volume or more and 95% by volume or less.

The average crystal particle diameter of the main phase is a value measured as follows.

A cross section of the sintered magnet is polished to be a mirror face, then immersed in an etching liquid (e.g., mixed liquid of nitric acid+hydrochloric acid+glycerin) to selectively remove the grain boundary phase, and arbitrary 10 portions or more of the cross section are observed with a laser microscope. The resultant measurement images are analyzed to calculate the cross sectional area of each particle. The cross sections are considered as circles, and the average diameter is taken as the average crystal particle diameter.

The volume ratio of the main phase is a value measured as follows.

Using EPMA, the structure observation of the anisotropic rare earth sintered magnet and the composition analysis of each phase therein are performed to confirm the main phase, the R-rich phase and the $R(Fe,Co)_2$ phase of the magnet. With that, the volume ratio of each phase is calculated as being equal to the area ratio of the images in the reflected electron image.

An oxycarbide of R is formed in the grain boundary area. Specifically the oxycarbide is preferably an oxycarbide of one or more kinds selected from the group consisting of an $R(C,O)_2$ phase, an $R_2(C,O)_3$ phase, and an $R(C,O)$ phase. In the case where the composition of the oxycarbide in the grain boundary area is analyzed by EPMA, R falls within a range of 25 to 65 atomic % including the influence of other phases and measurement fluctuation, and the remainder is C and O. However, Fe, Co, M and inevitable impurities can be contained at most approximately 10 atomic % or less. The C/O ratio in the oxycarbide is within a range of 2/8 to 8/2 as an atomic ratio. The oxycarbide is formed by reaction of Sm and other R with C and O in the liquid phase in the sintering step. The reason why densification is inhibited in a sintered magnet containing Sm is because of the influence of Sm vapor that forms during sintering, but when C and O are contained in a specific amount, formation of an oxycarbide is priority to Sm vaporizing reaction so that the amount of the Sm vapor to be formed reduces and the liquid phase sintering is promoted to give a good sintered body having a density of 7.3 g/cm³ or more. Preferably the amount of the oxycarbide to be formed in the sintered body is 1% by volume or more. When the amount of the oxycarbide formed is 1% by volume or more, the effect of inhibiting Sm vaporization can be more sufficient and a high sintered density can be more readily attained.

In the grain boundary area of the magnet structure, an R-rich phase and an $R(Fe,Co)_2$ phase may be further formed. The grain boundary area indicates a grain boundary triple point, a two-intergranular grain boundary and the like. Here, the R-rich phase is a phase that contains R in an amount of 40 atomic % or more. The $R(Fe,Co)_2$ phase is a compound phase having an $MgCu_2$ structure and called a Laves phase. Having the above-mentioned composition that contains an $M^1$ element, a magnet containing three phases of a main phase, an $R(Fe,Co)_2$ phase and an R-rich phase is easy to produce. For example, an Sm—Fe—Ti ternary sintered magnet not containing an $M^1$ element has a composition region where three phases of an $Sm(Fe,Ti)_{12}$ main phase and an $SmFe_2$ phase and an $Fe_2Ti$ phase (but excluding oxides) are equilibrated, in which, however, the $Sm(Fe,Ti)_{12}$ main phase and the Sm-rich phase are hardly equilibrated at a low temperature of 400° C. or lower, and therefore the Sm-rich phase cannot be formed as a stable phase. Contrary to this, in an Sm—Fe—V ternary magnet using V as one of the $M^1$ element, an Sm-rich phase having a high Sm concentration is formed, and accordingly a magnet having three phases of $Sm(Fe,V)_{12}$, $SmFe_2$ and an Sm-rich phase can be obtained. In an Sm—Fe—V—Ti quaternary magnet containing both $M^1$ and $M^2$, four phases of $Sm(Fe,VTi)_{12}$, $Fe_2(V,Ti)$, $SmFe_2$ and an Sm-rich phase exist stably. In the anisotropic rare earth sintered magnet of the present invention, a composition containing a predetermined amount of an $M^1$ element is selected in the case of forming an R-rich phase and an $R(Fe,Co)_2$ phase in the grain boundary area, based on the above-mentioned findings.

The R-rich phase and the $R(Fe,Co)_2$ phase provides mainly three effects. The first effect is an action of accelerating sintering. At a sintering temperature, both the R-rich phase and the $R(Fe,Co)_2$ phase melt to be liquid phases, and therefore liquid-phase sintering progresses, and finishes rapidly as compared with solid-phase sintering in the case not containing these phases. In addition, both the R-rich phase and the $R(Fe,Co)_2$ phase are present together, the liquid phase forming temperature tends to lower than that in the case of any one phase alone, and therefore liquid-phase sintering progresses rapidly.

The second effect is cleaning of the surfaces of the main phase grains. The anisotropic rare earth sintered magnet of the present invention has a nucleation-type coercive force mechanism, and therefore it is desirable that the surfaces of the main phase grains are flat and smooth so as to suppress nucleation in a reverse magnetic domain. The R-rich phase and the $R(Fe,Co)_2$ phase play a role of smoothening the surfaces of $ThMn_{12}$-type compound crystal particles in the sintering step or in the subsequent aging step, and owing to the cleaning effect, nucleation in the reverse magnetic domain to cause reduction in the coercive force can be suppressed. In particular, the $R(Fe,Co)_2$ phase has a high cleaning effect as having a relatively high wettability with the $ThMn_{12}$ phase and capable of readily covering the surfaces of the main phase particles, as compared with the other phases in which R accounts for less than 40 atomic %, for example, compound phases of $RM_3$, $RM_2$, $R(Fe,Co)M$ and $R(Fe,Co)_2M_2$.

The third effect is formation of a two-intergranular grain boundary phase. In a magnet containing an R-rich phase in the structure, a two-intergranular grain boundary phase that contains R more in the main phase is formed between the neighboring $ThMn_{12}$-type compound main phase particles, by optimum sintering treatment or aging treatment. Accordingly, the magnetic interaction between the main phase particles is weakened and the sintered magnet can show a high coercive force. However, a composition region where only the two phases of the $ThMn_{12}$-type compound main phase and the R-rich phase are equilibrated is extremely limitative, and therefore, in consideration of composition fluctuation, it is difficult to stably produce such a magnet. In only a magnet containing three phases of a $ThMn_{12}$-type compound main phase, an R-rich phase and an $R(Fe,Co)_2$ phase, a structure in which the surfaces of the main phase particles are coated with a two-intergranular grain boundary phase can be stably formed. In a magnet not having an R-rich phase, a two-intergranular grain boundary phase is difficult to form, or it is difficult to cover the surfaces of the main phase particles with a two-intergranular grain boundary phase, and accordingly in the case, a magnet having a sufficient coercive force is difficult to obtain.

As described above, the R-rich phase contains R in an amount of at least 40 atomic % or more. When the content of R is less than 40 atomic %, the wettability with the main phase is not sufficient and therefore the above-mentioned effect is difficult to attain. The content of R is more preferably 50 atomic % or more, especially preferably 60 atomic % or more. The R-rich phase may be an R metal phase like the above-mentioned Sm phase, or may also be an amorphous phase or a high-R low-melting-point intermetallic compound such as $R_3(Fe,Co,M)$, $R_2(Fe,Co,M)$, $R_5(Fe,Co,M)_3$, or $R(Fe,Co,M)$. The phase may contain elements of Fe, Co and M, as well as impurity elements such as H, B, C, N, O, F, P, S, Mg, Cl, and Ca, in a total amount of up to 60 atomic %.

On the other hand, the $R(Fe,Co)_2$ phase is an $MgCu_2$-type crystal Laves compound, and in consideration of measurement fluctuation in composition analysis with EPMA or the like, the phase may contain R in an amount of 20 atomic % or more and less than 40 atomic %. In this, a part of Fe and Co may be substituted with an M element. However, the substitution degree with M is within a range capable of maintaining the $MgCu_2$-type crystal structure.

The $R(Fe,Co)_2$ phase in the anisotropic rare earth sintered magnet of the present invention is preferably a ferromagnetic phase. The ferromagnetic phase as referred to herein is a phase showing ferromagneticity or ferrimagneticity and has a Curie temperature $T_c$ of room temperature (23° C.) or higher. Except $CeFe_2$, $RFe_2$ has $T_c$ of room temperature or higher. Also $CeFe_2$ can have $T_c$ of room temperature or higher so far as 10% or more of R is substituted with any other element. On the other hand, except $GdCo_2$, $RCo_2$ has $T_c$ of room temperature or lower, or is a paramagnetic phase. In the anisotropic rare earth sintered magnet of the present invention, however, the atom substitution degree of Fe with Co is 0.5 or less, the $R(Fe,Co)_2$ phase is a ferromagnetic phase almost in all cases. In general, a ferromagnetic phase contained in a structure has many negative influences on magnetic characteristics, but in the anisotropic rare earth sintered magnet of the present invention, it is considered that the cleaning effect for the surfaces of the main phase particles and the effect of forming a two-intergranular grain boundary phase by the $R(Fe,Co)_2$ phase therein are significant and even the ferromagnetic phase can contribute toward increase in the coercive force.

The formation amount of the R-rich phase and the $R(Fe,Co)_2$ phase is preferably 1% by volume or more in total, more preferably 1% by volume or more and less than 20% by volume. Even more preferably the amount is 1.5% by volume or more and less than 15% by volume, further more preferably within a range of 2% by volume or more and less than 10% by volume. Within the range, the area to be in contact with the main phase particles can be secured and the effect of increasing $H_{cJ}$ is easy to attain. In addition, Br reduction can be suppressed and desired magnetic characteristics are easy to attain.

In the anisotropic rare earth sintered magnet of the present invention, a two-intergranular grain boundary phase can be formed between the grains neighboring to the main phase grains formed of a $ThMn_{12}$-type compound. Also in the anisotropic rare earth sintered magnet of the present invention, as mentioned above, an R-rich phase and an $R(Fe,Co)_2$ phase can exist in the grain boundary area, and a two-intergranular grain boundary phase can be formed between the grains neighboring to the main phase grains formed of a $ThMn_{12}$-type compound. Since the surfaces of the main phase grains are covered with a two-intergranular grain boundary phase, the magnetic interaction between the main phase grains is weakened and a high coercive force can be thereby attained. The two-intergranular grain boundary phase may be an amorphous state where the atomic arrangement is not in order, or may have a regularity in the atomic arrangement. Also the phase may be the same phase as the R-rich phase and the $R(Fe,Co)_2$ phase existing in the grain boundary triple point.

In addition, the anisotropic rare earth sintered magnet of the present invention may contain an R oxide, an R carbide, an R nitride, and an M carbide. From the viewpoint of preventing degradation of magnetic characteristics, the volume ratio thereof is preferably 10% by volume or less, more preferably 5% by volume or less, especially preferably 3% by volume or less.

The ratio of the phases other than the above is preferably as small as possible, and for example, in the case where an $R_2(Fe,Co,M)_{17}$ phase and an $R_3(Fe,Co,M)_{29}$ phase exist in the magnet structure, the formation amount thereof is, from the viewpoint of suppressing the influence on magnetic characteristics and reduction in the coercive force, preferably less than 1% by volume each. Also from the viewpoint of securing a sufficient proportion of the main phase, it is preferable that the $(Fe,Co)_2M$ phase and $RM_3$, $RM_2$, $R(Fe,Co)M$, and $R(Fe,Co)_2M_2$ in which R accounts for less than 40 atomic % each are less than 1% by volume. Also preferably these phases are 3% by volume or less in total. Further, from the viewpoint of preventing remarkable degradation of magnetic characteristics, it is preferable that the anisotropic rare earth sintered magnet of the present invention does not contain an α-(Fe, Co) phase.

Next, the production method is described. The anisotropic rare earth sintered magnet of the present invention is produced according to a powder metallurgy process. First, an alloy containing a $ThMn_{12}$-type crystal compound phase and not containing an oxycarbide is ground, and then molded in a mode of pressure powder molding with magnetic field application thereto to give a molded article. Specifically first, for producing a raw material alloy metal materials, alloys or ferroalloys of R, Fe, Co and M are prepared, and in consideration of the Sm evaporation in sintering, the material loss in the production process and the like, these are formulated so that the sintered body to be obtained finally could have a predetermined composition. C can also be similarly formulated as a constituent element of the raw material alloy or a C-containing material such as a fatty acid or any other organic compound or carbon black may be prepared separately from the raw material alloy and this may be mixed in a raw material alloy powder in a later step. O can be contained in the raw material alloy but is preferably formulated so as to be a predetermined amount by controlling the process atmosphere in grinding, molding and sintering. These materials are melted in a high-frequency furnace or an arc furnace to form a raw material alloy containing a $ThMn_{12}$-type crystal compound phase. The molten metal material can be cooled by a casting method or can be formed into thin slices by a strip casting method. In the case of a strip casting method, it is preferable that the alloy is formed by controlling the cooling speed so that the average crystal particle diameter of the main phase or the average grain boundary phase distance thereof can be 1 μm or more. When it is less than 1 μm, the powder after powdering may be polycrystalline and if so, the main phase crystal particles could not sufficiently align in the step of molding in a magnetic field to cause $B_r$ reduction. In the case where α-Fe precipitates in the alloy, the material alloy may be heat-treated so as to remove α-Fe to thereby increase the amount of the $ThMn_{12}$-type compound phase to be formed.

As a raw material alloy, an alloy having a single composition can be used, or powders of alloys having a different composition may be prepared, and the alloy powders may be mixed in a later step to prepare a raw material alloy.

In the case of using a raw material alloy containing C, preferably the C element does not form an oxycarbide but forms a carbide such as $R_3C$, $R_2C$ and/or MCX in the raw material alloy. In the sintered magnet of the present invention, C plays a role of reducing Sm evaporation in the sintering step, for which an oxycarbide forming reaction needs to occur during sintering. Accordingly in the stage of the raw material alloy the ratio of an oxycarbide is preferably small, and more preferably no oxycarbide is contained in the raw material alloy.

The above-mentioned raw material alloy is roughly ground by mechanical grinding with a Braun mill or hydrogenation grinding to give a powder having an average particle diameter of 0.05 to 3 mm. An HDDR method (hydrogenation-disproportionation-desorption-recombination method) that is used as a production method for Nd—Fe—B-based magnets is also employable. Further, the roughly ground powder is finely pulverized with a ball mill or a jet mill using high-pressure nitrogen to be into a powder having an average particle diameter of 0.5 to 20 μm, more preferably 1 to 10 μm. For improving the orientation degree, a lubricant or the like may be added, as needed, before or after the finely pulverizing step. Next, using a magnetic-field pressing device, the alloy powder is molded while the magnetization easy axis thereof is oriented in the magnetic field applied, thereby giving a powder-compression molded article. Preferably the molding is performed in vacuum or in a nitrogen gas atmosphere or an inert gas atmosphere such as Ar, for preventing oxidation of the alloy powder.

The step of sintering the powder-compression molded article is performed in vacuum or in an inert gas atmosphere using a sintering furnace at a temperature of 800° C. or higher and 1400° C. or lower. In the sintering step, an oxycarbide is formed in the grain boundary area. With that, Sm vapor generation is reduced and the sintered density of the sintered magnet increases. When the temperature is lower than 800° C., sintering could not progress sufficiently irrespective of Sm evaporation and therefore a high sintered density could not be attained, but when the temperature is higher than 1400° C., the main phase of a $ThMn_{12}$-type compound may decompose to form an α-Fe precipitate. The sintering temperature is preferably within a range of 900 to 1300° C. The sintering time is preferably 0.5 to 20 hours, more preferably 1 to 10 hours. Regarding the sintering pattern, the molded article may be once heated, then kept at a predetermined temperature, or for further refining the crystal grains, a two-stage sintering pattern can also be employed in which the molded article is once heated up to a first sintering temperature and then kept for a predetermined period of time at a second sintering temperature lower than the first sintering temperature. Plural times of sintering can be performed. The cooling speed after the sintering is not specifically limited. For example, at least down to 600° C. or lower, preferably 200° C. or lower, the sintered article can be cooled preferably at 1° C./min or more and 100° C./min or less, more preferably at 5° C./min or more and 50° C./min or less. For improving the coercive force, aging heat treatment at 300 to 900° C. for 0.5 to 50 hours can be further performed. By optimizing the sintering and aging conditions in accordance with the composition and the powder size, $H_{cJ}$ can be improved. Further, the sintered article is cut and polished into a predetermined shape, and magnetized to be a sintered magnet.

The anisotropic rare earth sintered magnet of the present invention thus produced has a sintered density of 7.3 g/cm³ or more. When the sintered density is lower than 7.3 g/cm³, densification is not sufficient and there exist many voids and pores in the structure of the sintered body to lower magnetic characteristics. In addition, owing to oxidation reaction in air, temporal degradation readily occurs. The sintered magnet has a sintered density of 7.3 g/cm³ or more, and has a residual magnetic flux density $B_r$ of 5 kG or more and a coercive force $H_{cJ}$ of at least 5 kOe or more at room temperature. The room temperature $H_{cJ}$ is more preferably 8 kOe or more. Another characteristic is that the temperature coefficient β of the coercive force is −0.5%/K or more. Here, $β=ΔH_{cJ}/ΔT×100/H_{cJ}$ (20° C.) ($ΔH_{cJ}=H_{cJ}$(20° C.)-$H_{cJ}$(140° C.), ΔT=20-140(° C.)). The anisotropic rare earth sintered magnet of the present invention has a smaller temperature change in coercive force than an Nd—Fe—B sintered magnet, and is suitable for use at high temperatures.

EXAMPLES

Hereinunder the present invention is described specifically by showing Examples and Comparative Examples, but the present invention is not limited to the following Examples.

Examples 1 to 4, Comparative Example 1

Using an Sm metal, an electrolytic iron, a Co metal, a V metal, a pure Si and an Al metal, a composition was prepared, and, using a high-frequency induction furnace, melted in an Ar gas atmosphere to produce a cast alloy. For dispersing the primary crystal α-Fe, the alloy was heat-treated at 900° C. for 20 hours. The cross section of the alloy was polished and etched, and the structure thereof was observed with a laser microscope (LEXT OLS4000, by Olympus Corporation). The observed image confirmed that the average crystal particle diameter of the main phase is 5 μm or more. A part of the alloy was ground and the resultant powder was analyzed by X-ray diffractometry, which confirmed that the alloy contains a $ThMn_{12}$-type crystal compound. By observation with an EPMA apparatus (JXA-8500F, by JEOL Corporation), it was confirmed that no oxycarbide was formed in the alloy. The alloy was subjected to hydrogen absorption treatment and to dehydrogenation treatment by heating in vacuum at 400° C. to give a coarse powder, then mixed with stearic acid in a different mixing ratio, and finely pulverized in a jet mill in a nitrogen stream atmosphere to give a fine powder having an average particle diameter of 1.9 μm in every case. Further, this was charged in a mold of a molding apparatus in an inert gas atmosphere, and molded in a mode of pressure powder molding in an magnetic field to give a molded article, then this was sintered by heat treatment at 1140° C. for 3 hours in an Ar gas atmosphere, and thereafter cooled down to room temperature at a cooling speed of 12° C./min. All these sintered articles were cut into a size of 10×10×12 mm. Among the resultant sintered body samples, those mixed with stearic acid in an amount of 0.1, 0.15, 0.2 or 0.3% by weight are referred to as Examples 1 to 4 in order, and the sample not mixed with stearic acid is referred to as Comparative Example 1.

The density of the sintered article was determined from the weight of the sample and the measured dimension. In composition analysis, the C element was determined according to a combustion-IR absorption method using a carbon/sulfur analyzer (by LECO Corporation), and the 0 element was determined according to an inert gas-fusion IR absorption method using an oxygen/nitrogen/hydrogen analyzer (by LECO Corporation). The other elements were determined according to a high-frequency inductively coupled plasma optical emission spectrometry (ICP-OES), using a high-frequency inductively coupled plasma optical emission spectrometer (SPS3520UV-DD, by Hitachi High-Tech Science Corporation). The crystal structure of the main phase was identified by X-ray diffractometry of a powder prepared by grinding a part of each sintered article. In Examples 1 to 4 and Comparative Example 1, the main phase all had a $ThMn_{12}$-type structure. The average crystal particle diameter of the main phase in each sintered article was calculated from the observation results of the surface of the sintered article after polishing and etching the surface. For the structure observation of the sintered article and the composition analysis of each phase, the EMPA apparatus was used. The magnetic characteristics were measured with a B—H tracer.

Tables 1 and 2 show the metered composition of the raw material alloy, the composition analysis data of the sintered article, the average crystal particle diameter of the main phase particles in the sintered article, the crystal structure of the main phase, the density and the magnetic characteristics ($B_r$ at room temperature, $H_{cJ}$ at room temperature, temperature coefficient β of $H_{cJ}$). In Comparative Example 1 in which stearic acid was not added, the density of the sintered article was 6.58 g/cm³ and was low, but in Examples 1 to 4 in which stearic acid was added and mixed, the density was 7.3 g/cm³ or more and was high in every case. In Examples 1 to 4 and Comparative Example 1, the same raw material alloy was used, but, as seen from the composition analysis data, the Sm concentration in the sintered article was higher in Examples 1 to 4 than in Comparative Example 1, and it is known that in Examples 1 to 4, the Sm element loss was small in the process of producing the sintered article. In all Examples 1 to 4, the average crystal particle diameter was more than 1 μm, the coercive force at room temperature was 5 kOe or more, and the temperature coefficient β of the coercive force was −0.5%/K or more.

Table 3 shows the composition analysis data and the volume % of each phase. In Examples 1 to 4, an R-rich phase, a $R(Fe,Co)_2$ phase and an R(C,O) phase of an oxycarbide existed each in an amount of 1% by volume or more in the grain boundary area. On the other hand, in Comparative Example 1, an oxycarbide existed, but the proportion thereof was less than 1% by volume. An $R_2(Fe,Co,M)_{17}$ phase, an $R_3(Fe,Co,M)_{29}$ phase and an α-Fe phase were not observed in every sample. Based on the analysis data of the $R(Fe,Co)_2$ phase in Examples 1 to 4, alloys having the same composition were produced by arc melting, then homogenized at 830° C. for 10 hours, and subjected to magnetization-temperature measurement with VSM. The Curie temperature $T_c$ was 300° C. or higher in every case, from which it is confirmed that the alloy is ferromagnetic at room temperature.

Examples 5 to 7, Comparative Example 2

Using an Sm metal, a Ce metal, an electrolytic iron, a Co metal, a V metal, a Ga metal and carbon black, a composition was prepared, and, using a high-frequency induction furnace, melted in an Ar gas atmosphere to produce plural cast alloys having a different C content. For dispersing the primary crystal C—Fe, every alloy was heat-treated at 830° C. for 30 hours. The cross section of each alloy was polished and etched, and the structure thereof was observed with a laser microscope. The observed images confirmed that the average crystal particle diameter of the main phase is 5 μm or more in every case. Apart of the alloy was ground and the resultant powder was analyzed by X-ray diffractometry, which confirmed that the alloys contained a $ThMn_{12}$-type crystal compound. By EPMA observation, it was confirmed that no oxycarbide was formed in these alloys but the alloys added with carbon black had an $Sm_3C$ phase existing therein. Every alloy was subjected to hydrogen absorption treatment and to dehydrogenation treatment by heating in vacuum at 400° C. to give a coarse powder, then mixed with 0.02% by weight of stearic acid, and finely pulverized in a jet mill in a nitrogen stream atmosphere to give a fine powder having an average particle diameter of 2.1 μm in every case. Further, this was charged in a mold of a molding apparatus in an inert gas atmosphere, and molded in a mode of pressure powder molding in an magnetic field to give a molded article, then this was sintered by heat treatment at 1110° C. for 3 hours in an Ar gas atmosphere, and thereafter cooled down to room temperature at a cooling speed of 12° C./min. The sintered samples produced using an alloy added with carbon black are referred to as Examples 5 to 7, and the other produced using an alloy not added with carbon black is referred to as Comparative Example 2.

Tables 1 and 2 show the results of Examples 5 to 7 and Comparative Example 2. In Comparative Example 2 in which carbon black was not added to the raw material alloy, the C content in the sintered article was 0.10% by weight and was small and the sintered article density was 7.08 g/cm³ and was low, while on the other hand, in Examples 5 to 7 in which alloys containing a predetermined amount of a C element were used, all the sintered samples had a density of 7.3 g/cm³ or more. In addition, the Sm concentration in the sintered articles was higher in Examples 5 to 7 than in Comparative Example 2. In Examples 5 to 7, the average crystal particle diameter was more than 1 μm in every case, the coercive force was 5 kOe or more at room temperature, and the temperature coefficient β of the coercive force was −0.5%/K or more.

Table 4 shows the composition analysis data and the volume % of each phase. In Examples 5 to 7, an R-rich phase, a $R(Fe,Co)_2$ phase and an R(C,O) phase of an oxycarbide existed each in an amount of 1% by volume or more in the grain boundary area. On the other hand, in Comparative Example 2, an oxycarbide existed, but the proportion thereof was less than 1% by volume. An $R_2(Fe,Co,M)_{17}$ phase, an $R_3(Fe,Co,M)_{29}$ phase and an α-Fe phase were not observed in every sample. In addition, the $Sm_3C$ phase seen in the raw material alloy was not observed. Based on the analysis data of the $R(Fe,Co)_2$ phase in Examples 5 to 7, alloys having the same composition were produced by arc melting, then homogenized at 800° C. for 15 hours, and subjected to magnetization-temperature measurement with VSM. The Curie temperature $T_c$ was 300° C. or higher in every case.

Example 8

Using an Sm metal, an Nd metal, a Y metal, an electrolytic iron, a Cr metal, an Ni metal, a sponge titanium and active carbon, a composition was prepared, and, using a high-frequency induction furnace, melted in an Ar gas atmosphere, and then strip-cast on a water-cooled Cu roll to produce an alloy strip having a thickness of approximately 0.2 to 0.4 mm. At a position of about 0.15 mm of the surface of the strip separated from the chill roll having been brought into contact therewith, the strip was observed with a laser microscope, and it was confirmed that the average crystal particle diameter in the minor axis direction of the main phase was 1 µm or more. Apart of the alloy was ground and the resultant powder was analyzed by X-ray diffractometry, which confirmed that the alloy contained a ThMn$_{12}$-type crystal compound. By EPMA observation, it was confirmed that no oxycarbide formed in the alloy, but an Sm$_3$C phase formed therein. The alloy was subjected to hydrogen absorption treatment and dehydrogenation treatment to give a coarse powder, which was then finely pulverized in a jet mill in a nitrogen stream atmosphere to give a fine powder having an average particle diameter of 2.7 µm. Further, this was charged in a mold of a molding apparatus in an inert gas atmosphere, and molded in a mode of pressure powder molding in an magnetic field to give a molded article, then this was sintered by heat treatment at 1170° C. for 4 hours in an Ar gas atmosphere, and thereafter cooled down to room temperature at a cooling speed of 14° C./min.

Example 9

Using an Sm metal, a Pr metal, an La metal, an electrolytic iron, a Co metal, a pure Si, an Mn metal, an Al metal, an Nb metal and a high-carbon ferromanganese, a composition was prepared, and then formed into an alloy strip according to a strip-casting method. It was confirmed that, at a position of about 0.15 mm of the strip separated from the roll contact surface, the average crystal particle diameter in the minor axis direction of the main phase was 1 µm or more. A part of the alloy was ground and the resultant powder was analyzed by X-ray diffractometry, which confirmed that the alloy contained a ThMn$_{12}$-type crystal compound. By EPMA observation, it was confirmed that no oxycarbide formed in the alloy, but an Sm$_3$C phase and an NbC phase formed therein. The alloy was subjected to hydrogen absorption treatment and dehydrogenation treatment to give a coarse powder, which was then finely pulverized in a jet mill in a nitrogen stream atmosphere to give a fine powder having an average particle diameter of 2.3 µm. Further, this was charged in a mold of a molding apparatus in an inert gas atmosphere, and molded in a mode of pressure powder molding in an magnetic field to give a molded article, then this was sintered by heat treatment at 1120° C. for 2 hours in an Ar gas atmosphere, and thereafter cooled down to room temperature at a cooling speed of 10° C./min.

Example 10, Comparative Example 3

Using an Sm metal, a Zr metal, an electrolytic iron, a V metal, a pure Si and a Cu metal, a composition was prepared, and formed into an alloy strip according to a strip-casting method. It was confirmed that, at a position of about 0.15 mm of the strip separated from the roll contact surface, the average crystal particle diameter in the minor axis direction of the main phase was 1 µm or more. A part of the alloy was ground and the resultant powder was analyzed by X-ray diffractometry, which confirmed that the alloy contained a ThMn$_{12}$-type crystal compound. By EPMA observation, it was confirmed that no oxycarbide formed in the alloy. The alloy was subjected to hydrogen absorption treatment and dehydrogenation treatment to give a coarse powder, which was mixed with 0.2% by weight of powdery carbon black, and then finely pulverized in a jet mill in a nitrogen stream atmosphere to give a fine powder having an average particle diameter of 2.4 µm. Further, this was charged in a mold of a molding apparatus in an inert gas atmosphere, and molded in a mode of pressure powder molding in an magnetic field to give a molded article, then this was sintered by heat treatment at 1160° C. for 3 hours in an Ar gas atmosphere, and thereafter cooled down to room temperature at a cooling speed of 10° C./min. This is Example 10. A sample was produced in the same manner as above but not adding carbon black thereto, and this is Comparative Example 3.

Tables 1, 2 and 5 show the results of Examples 8 to 10 and Comparative Example 3. The sintered article density was 7.3 g/cm$^3$ or more in Examples 8 to 10, and 6.38 g/cm$^3$ in Comparative Example 3. In Examples 8 to 10, the average crystal particle diameter was more than 1 µm in every case, the coercive force at room temperature was 5 kOe or more, and the temperature coefficient β of the coercive force was −0.5%/K or more. In addition, in these, an R-rich phase, an R(Fe,Co)$_2$ phase and an R(C,O) phase of an oxycarbide existed in the grain boundary area each in an amount of 1% by volume or more. On the other hand, in Comparative Example 3, an oxycarbide did not exist. Based on the analysis data of the R(Fe,Co)$_2$ phase in Examples 8 to 10, alloys having the same composition were produced by arc melting, then homogenized at 800° C. for 15 hours, and subjected to magnetization-temperature measurement with VSM. The Curie temperature T$_c$ was 200° C. or higher in every case.

Comparative Example 4

Using an Sm metal, an electrolytic iron, and a V metal, a composition was prepared, and the raw material melt was cooled on a Cu roll rotating at a peripheral speed of 20 m/sec to produce a quenched strip of the raw material alloy. The thickness of the strip was 10 to 50 µm, and the structure of the resultant alloy was observed with a laser microscope. Though difficult to measure on the observed image since the particles were too much fine, the average crystal particle diameter was confirmed to be smaller than at least 1 µm. The alloy strip was ground in a ball mill, and sieved through a screen to separate a powder having a size of 300 µm or less, and 0.2% by weight of stearic acid was added thereto. This was kept at 720° C. for 5 minutes in an Ar atmosphere, and then hot pressed under a pressure of about 500 MPa. The density of the resultant sample was 7.12 g/cm$^3$. The average crystal particle diameter of the main phase particles was 0.3 to 0.4 µm or so, and in EMPA, the composition in the main phase and the grain boundary phase could not be identified. In addition, since the magnetization easy axis in the main phase was not aligned, the B$_r$ was low. The results are shown in Tables 1, 2 and 5.

TABLE 1

| | Weighed Composition of Raw Material Alloy (atomic %) | ICP Composition Analysis Data of Sintered Article (atomic %) | Remarks (mixed in alloy powder) |
|---|---|---|---|
| Example 1 | Sm$_{12.0}$ Fe$_{bal.}$ Co$_{2.0}$ V$_{14.5}$ Si$_{0.2}$ Al$_{0.3}$ | Sm$_{10.0}$ Fe$_{bal.}$ Co$_{1.9}$ V$_{14.0}$ Si$_{0.2}$ Al$_{0.3}$ C$_{0.35}$ O$_{2.25}$ | stearic acid 0.1% by weight |
| Example 2 | | Sm$_{10.2}$ Fe$_{bal.}$ Co$_{1.9}$ V$_{13.9}$ Si$_{0.2}$ Al$_{0.3}$ C$_{0.49}$ O$_{2.23}$ | stearic acid 0.15% by weight |
| Example 3 | | Sm$_{10.4}$ Fe$_{bal.}$ Co$_{1.9}$ V$_{14.0}$ Si$_{0.2}$ Al$_{0.3}$ C$_{0.63}$ O$_{2.19}$ | stearic acid 0.2% by weight |
| Example 4 | | Sm$_{10.9}$ Fe$_{bal.}$ Co$_{1.9}$ V$_{13.8}$ Si$_{0.2}$ Al$_{0.3}$ C$_{0.91}$ O$_{2.28}$ | stearic acid 0.3% by weight |

TABLE 1-continued

| | Weighed Composition of Raw Material Alloy (atomic %) | ICP Composition Analysis Data of Sintered Article (atomic %) | Remarks (mixed in alloy powder) |
|---|---|---|---|
| Comparative Example 1 | | $Sm_{9.3} Fe_{bal.} Co_{2.0} V_{14.3} Si_{0.2} Al_{0.3} C_{0.07} O_{2.22}$ | not mixed |
| Example 5 | $Sm_{8.7} Ce_{2.5} Fe_{bal.} Co_{4.5} V_{12.0} Ga_{0.6} C_{0.2}$ | $Sm_{6.7} Ce_{2.5} Fe_{bal.} Co_{4.5} V_{12.0} Ga_{0.5} C_{0.33} O_{1.79}$ | stearic acid 0.02% by weight |
| Example 6 | $Sm_{8.7} Ce_{2.5} Fe_{bal.} Co_{4.5} V_{12.0} Ga_{0.6} C_{0.4}$ | $Sm_{7.0} Ce_{2.6} Fe_{bal.} Co_{4.4} V_{11.8} Ga_{0.5} C_{0.55} O_{1.97}$ | |
| Example 7 | $Sm_{8.7} Ce_{2.5} Fe_{bal.} Co_{4.5} V_{12.0} Ga_{0.6} C_{0.6}$ | $Sm_{7.3} Ce_{2.6} Fe_{bal.} Co_{4.4} V_{11.8} Ga_{0.6} C_{0.62} O_{1.89}$ | |
| Comparative Example 2 | $Sm_{8.7} Ce_{2.5} Fe_{bal.} Co_{4.5} V_{12.0} Ga_{0.6}$ | $Sm_{6.5} Ce_{2.4} Fe_{bal.} Co_{4.5} V_{12.0} Ga_{0.5} C_{0.10} O_{1.72}$ | |
| Example 8 | $Sm_{7.5} Nd_{3.0} Y_{0.5} Fe_{bal.} Cr_{15.0} Ni_{2.8} Ti_{0.3} C_{0.5}$ | $Sm_{6.4} Nd_{2.9} Y_{0.5} Fe_{bal.} Cr_{13.4} Ni_{2.5} Ti_{0.5} C_{0.47} O_{0.65}$ | not mixed |
| Example 9 | $Sm_{8.0} Pr_{1.8} La_{0.8} Fe_{bal.} Si_{12.0} Mn_{5.0} Nb_{1.0} C_{0.6}$ | $Sm_{7.2} Pr_{1.7} La_{1.0} Fe_{bal.} Si_{11.7} Mn_{3.4} Nb_{1.0} C_{0.67} O_{0.75}$ | not mixed |
| Example 10 | $Sm_{10.5} Zr_{0.5} Fe_{bal.} Co_{8.0} V_{7.0} Si_{5.2} Cu_{0.8}$ | $Sm_{9.7} Zr_{0.4} Fe_{bal.} Co_{7.9} V_{7.6} Si_{5.5} Cu_{0.8} C_{0.67} O_{0.96}$ | carbon black 0.2% by weight |
| Comparative Example 3 | | $Sm_{8.8} Zr_{0.5} Fe_{bal.} Co_{8.0} V_{7.5} Si_{5.7} Cu_{0.8} C_{0.04} O_{1.02}$ | not mixed |
| Comparative Example 4 | $Sm_{12.0} Fe_{bal.} V_{16.0}$ | $Sm_{10.7} Fe_{bal.} V_{16.2} C_{0.54} O_{1.16}$ | stearic acid 0.2% by weight |

TABLE 2

| | Average Crystal Particle Diameter (μm) | Crystal Structure of Main Phase | Density (g/cm³) | $B_r$ (kG) | $Hc_J$ (kOe) | B (%/K) |
|---|---|---|---|---|---|---|
| Example 1 | 8.2 | $ThMn_{12}$ | 7.37 | 8.7 | 8.4 | −0.45 |
| Example 2 | 8.3 | $ThMn_{12}$ | 7.64 | 9 | 9.1 | −0.43 |
| Example 3 | 8.3 | $ThMn_{12}$ | 7.73 | 9 | 10 | −0.42 |
| Example 4 | 8.4 | $ThMn_{12}$ | 7.74 | 9.1 | 9.9 | −0.42 |
| Comparative Example 1 | 8.6 | $ThMn_{12}$ | 6.58 | 7.6 | 6.5 | −0.51 |
| Example 5 | 9.9 | $ThMn_{12}$ | 7.43 | 9.7 | 5.6 | −0.47 |
| Example 6 | 9.7 | $ThMn_{12}$ | 7.68 | 10.4 | 6.9 | −0.47 |
| Example 7 | 9.8 | $ThMn_{12}$ | 7.76 | 10.8 | 7 | −0.46 |
| Comparative Example 2 | 9.8 | $ThMn_{12}$ | 7.01 | 8.6 | 4.2 | −0.52 |
| Example 8 | 11.1 | $ThMn_{12}$ | 7.59 | 9.7 | 5.3 | −0.41 |
| Example 9 | 7.6 | $ThMn_{12}$ | 7.67 | 10.4 | 6.4 | −0.46 |
| Example 10 | 6.7 | $ThMn_{12}$ | 7.77 | 10.8 | 8.2 | −0.44 |
| Comparative Example 3 | 6.9 | $ThMn_{12}$ | 6.38 | 8.6 | 5.1 | −0.51 |
| Comparative Example 4 | <1 μm | $ThMn_{12}$ | 7.12 | 2.1 | 1.9 | — |

TABLE 3

| | Composition Phase | EPMA Composition Analysis Data of Each Phase (atomic %) | Phase Ratio (% by volume) |
|---|---|---|---|
| Example 1 | $R(FeCoM)_{12}$ Phase | $Sm_{7.7} Fe_{bal.} Co_{1.8} V_{14.9} Si_{0.2} Al_{0.3}$ | 92.2 |
| | R-rich Phase | $Sm_{67.8} Fe_{bal.} Co_{28.9} V_{0.3} Si_{0.4} C_{0.1}$ | 1.5 |
| | $R(FeCo)_2$ Phase | $Sm_{33.1} Fe_{bal.} Co_{0.1} V_{0.1}$ | 1 |
| | Oxycarbide Phase | $Sm_{50.6} C_{15.2} O_{34.3}$ | 3.1 |
| | $R_2O_3$ Phase | $Sm_{36.7} C_{0.1} O_{63.2}$ | 2.2 |
| Example 2 | $R(FeCoM)_{12}$ Phase | $Sm_{7.7} Fe_{bal.} Co_{1.8} V_{14.9} Si_{0.2} Al_{0.3} O_{0.1}$ | 91.4 |
| | R-rich Phase | $Sm_{67.6} Fe_{bal.} Co_{28.7} V_{0.3} Si_{0.4} C_{0.2}$ | 1.4 |
| | $R(FeCo)_2$ Phase | $Sm_{32.6} Fe_{bal.} Co_{0.2}$ | 1.3 |
| | Oxycarbide Phase | $Sm_{51.0} C_{17.1} O_{31.9}$ | 3.9 |
| | $R_2O_3$ Phase | $Sm_{36.9} C_{0.1} O_{63.0}$ | 2 |
| Example 3 | $R(FeCoM)_{12}$ Phase | $Sm_{7.7} Fe_{bal.} Co_{1.8} V_{15.0} Si_{0.2} Al_{0.3}$ | 90.7 |
| | R-rich Phase | $Sm_{65.8} Fe_{bal.} Co_{26.8} V_{0.3} Si_{0.3} C_{0.1}$ | 1.7 |
| | $R(FeCo)_2$ Phase | $Sm_{32.4} Fe_{bal.} Co_{0.1} V_{0.1}$ | 1.6 |
| | Oxycarbide Phase | $Sm_{52.5} C_{23.4} O_{24.0}$ | 3.8 |
| | $R_2O_3$ Phase | $Sm_{36.4} O_{63.6}$ | 2.3 |
| Example 4 | $R(FeCoM)_{12}$ Phase | $Sm_{7.7} Fe_{bal.} Co_{1.8} V_{15.0} Si_{0.2} Al_{0.3}$ | 89.2 |
| | R-rich Phase | $Sm_{65.4} Fe_{bal.} Co_{26.3} V_{0.3} Si_{0.3} C_{0.1} O_{0.1}$ | 1.7 |
| | $R(FeCo)_2$ Phase | $Sm_{32.1} Fe_{bal.} Co_{0.3} V_{0.2}$ | 1.6 |
| | Oxycarbide Phase | $Sm_{52.2} C_{21.8} O_{26.0}$ | 5.8 |
| | $R_2O_3$ Phase | $Sm_{36.1} C_{0.2} O_{63.7}$ | 1.7 |
| Comparative Example 1 | $R(FeCoM)_{12}$ Phase | $Sm_{7.7} Fe_{bal.} Co_{1.8} V_{15.0} Si_{0.2} Al_{0.3}$ | 94.4 |
| | R-rich Phase | $Sm_{65.7} Fe_{bal.} Co_{26.6} V_{0.3} Si_{0.3} O_{0.1}$ | 1.6 |
| | $R(FeCo)_2$ Phase | $Sm_{32.0} Fe_{bal.} Co_{0.2} V_{0.1}$ | 0.2 |
| | Oxycarbide Phase | $Sm_{51.9} C_{20.1} O_{27.9}$ | 0.5 |
| | $R_2O_3$ Phase | $Sm_{36.3} C_{0.1} O_{63.6}$ | 3.3 |

TABLE 4

| | Composition Phase | EPMA Composition Analysis Data of Each Phase (atomic %) | Phase Ratio (% by volume) |
|---|---|---|---|
| Example 5 | R(FeCoM)$_{12}$ Phase | Sm$_{5.4}$ Ce$_{2.1}$ Fe$_{bal.}$ Co$_{4.7}$ V$_{12.6}$ Ga$_{0.4}$ | 93.6 |
| | R-rich Phase | Sm$_{64.0}$ Ce$_{6.2}$ Fe$_{bal.}$ Co$_{0.1}$ Ga$_{24.3}$ C$_{0.3}$ O$_{0.1}$ | 1.2 |
| | R(FeCo)$_2$ Phase | Sm$_{22.3}$ Ce$_{7.3}$ Fe$_{bal.}$ Co$_{2.6}$ V$_{0.6}$ C$_{0.1}$ | 1.2 |
| | Oxycarbide Phase | Sm$_{32.6}$ Ce$_{11.3}$ C$_{14.2}$ O$_{41.9}$ | 2.8 |
| | R$_2$O$_3$ Phase | Sm$_{24.8}$ Ce$_{9.3}$ C$_{0.3}$ O$_{65.6}$ | 1.2 |
| Example 6 | R(FeCoM)$_{12}$ Phase | Sm$_{5.4}$ Ce$_{2.1}$ Fe$_{bal.}$ Co$_{4.7}$ V$_{12.6}$ Ga$_{0.4}$ | 92.2 |
| | R-rich Phase | Sm$_{22.3}$ Ce$_{7.3}$ Fe$_{bal.}$ Co$_{2.6}$ V$_{0.6}$ C$_{0.1}$ O$_{0.1}$ | 1.6 |
| | R(FeCo)$_2$ Phase | Sm$_{64.0}$ Ce$_{6.2}$ Fe$_{bal.}$ Co$_{0.1}$ Ga$_{24.3}$ | 1.1 |
| | Oxycarbide Phase | Sm$_{32.7}$ Ce$_{11.3}$ C$_{14.7}$ O$_{41.3}$ | 4.5 |
| | R$_2$O$_3$ Phase | Sm$_{25.0}$ Ce$_{9.4}$ C$_{0.2}$ O$_{65.6}$ | 0.7 |
| Example 7 | R(FeCoM)$_{12}$ Phase | Sm$_{5.4}$ Ce$_{2.1}$ Fe$_{bal.}$ Co$_{4.7}$ V$_{12.6}$ Ga$_{0.4}$ | 91.2 |
| | R-rich Phase | Sm$_{63.1}$ Ce$_{6.1}$ Fe$_{bal.}$ Co$_{0.1}$ Ga$_{23.6}$ C$_{0.3}$ O$_{0.1}$ | 1.9 |
| | R(FeCo)$_2$ Phase | Sm$_{22.5}$ Ce$_{7.4}$ Fe$_{bal.}$ Co$_{2.6}$ V$_{0.6}$ C$_{0.1}$ | 1.7 |
| | Oxycarbide Phase | Sm$_{32.8}$ Ce$_{11.3}$ C$_{15.1}$ O$_{40.8}$ | 4.9 |
| | R$_2$O$_3$ Phase | Sm$_{25.1}$ Ce$_{9.5}$ C$_{0.2}$ O$_{65.3}$ | 0.3 |
| Comparative Example 2 | R(FeCoM)$_{12}$ Phase | Sm$_{5.4}$ Ce$_{2.1}$ Fe$_{bal.}$ Co$_{4.7}$ V$_{12.5}$ Ga$_{0.4}$ | 94.4 |
| | R-rich Phase | Sm$_{61.3}$ Ce$_{5.9}$ Fe$_{bal.}$ Co$_{0.1}$ Ga$_{22.2}$ C$_{0.2}$ O$_{0.1}$ | 1.1 |
| | R(FeCo)$_2$ Phase | Sm$_{23.1}$ Ce$_{7.6}$ Fe$_{bal.}$ Co$_{2.8}$ V$_{0.7}$ C$_{0.1}$ | 1.5 |
| | Oxycarbide Phase | Sm$_{32.2}$ Ce$_{11.1}$ C$_{11.9}$ O$_{44.8}$ | 0.7 |
| | R$_2$O$_3$ Phase | Sm$_{25.4}$ Ce$_{9.6}$ C$_{0.4}$ O$_{64.6}$ | 2.1 |

TABLE 5

| | Composition Phase | EPMA Composition Analysis Data of Each Phase (atomic %) | Phase Ratio (% by volume) |
|---|---|---|---|
| Example 8 | R(FeCoM)$_{12}$ Phase | Sm$_{4.9}$ Nd$_{2.5}$ Y$_{0.4}$ Fe$_{bal.}$ Cr$_{14.1}$ N$_{12.5}$ Ti$_{0.2}$ | 93 |
| | R-rich Phase | Sm$_{62.5}$ Nd$_{16.1}$ Y$_{2.6}$ Fe$_{bal.}$ Cr$_{0.1}$ C$_{0.1}$ O$_{0.1}$ | 1.8 |
| | R(FeCo)$_2$ Phase | Sm$_{30.7}$ Nd$_{6.9}$ Y$_{0.3}$ Fe$_{bal.}$ Cr$_{0.8}$ Ni$_{0.1}$ | 2.6 |
| | RNi Phase | Sm$_{32.8}$ Nd$_{15.5}$ Y$_{2.1}$ Fe$_{bal.}$ Cr$_{0.4}$ Ni$_{49.0}$ C$_{0.1}$ | 0.5 |
| | TiC Phase | Ti$_{51.9}$ C$_{48.1}$ | 0.4 |
| | Oxycarbide Phase | Sm$_{26.4}$ Nd$_{11.6}$ Y$_{5.6}$ C$_{14.1}$ O$_{42.3}$ | 1.7 |
| | R$_2$O$_3$ Phase | — | — |
| Example 9 | R(FeCoM)$_{12}$ Phase | Sm$_{5.8}$ Pr$_{1.3}$ La$_{0.8}$ Fe$_{bal.}$ Si$_{11.9}$ Mn$_{3.5}$ Nb$_{0.8}$ C$_{0.1}$ | 92.1 |
| | R-rich Phase | Sm$_{40.8}$ Pr$_{16.0}$ La$_{13.1}$ Fe$_{bal.}$ Si$_{28.6}$ O$_{0.1}$ | 2.7 |
| | R(FeCo)$_2$ Phase | Sm$_{21.1}$ Pr$_{5.3}$ La$_{4.4}$ Fe$_{bal.}$ Si$_{0.4}$ Mn$_{3.1}$ C$_{0.1}$ | 1.2 |
| | NbC Phase | Nb$_{53.0}$ C$_{47.0}$ | 0.7 |
| | Oxycarbide Phase | Sm$_{43.7}$ Pr$_{9.0}$ La$_{2.0}$ C$_{18.5}$ O$_{26.8}$ | 2.7 |
| | R$_2$O$_3$ Phase | Sm$_{38.4}$ Pr$_{7.4}$ La$_{0.1}$ C$_{0.3}$ O$_{53.8}$ | 0.6 |
| Example 10 | R(FeCoM)$_{12}$ Phase | Sm$_{7.0}$ Zr$_{0.7}$ Fe$_{bal.}$ Co$_{8.3}$ V$_{7.9}$ Si$_{5.5}$ Cu$_{0.6}$ | 91.3 |
| | R-rich Phase | Sm$_{64.9}$ Zr$_{0.3}$ Fe$_{bal.}$ Si$_{34.5}$ | 2 |
| | R(FeCo)$_2$ Phase | Sm$_{43.8}$ Zr$_{0.1}$ Fe$_{bal.}$ Co$_{8.9}$ V$_{0.3}$ Si$_{0.2}$ | 1.4 |
| | RCu$_2$ Phase | Sm$_{37.4}$ Fe$_{bal.}$ V$_{0.2}$ CU$_{61.7}$ | 0.4 |
| | ZrC Phase | Sm$_{4.9}$ Zr$_{46.7}$ C$_{48.4}$ | 0.4 |
| | Oxycarbide Phase | Sm$_{52.6}$ C$_{17.4}$ O$_{30.1}$ | 4.5 |
| | R$_2$O$_3$ Phase | — | — |
| Comparative Example 3 | R(FeCoM)$_{12}$ Phase | Sm$_{7.1}$ Zr$_{0.6}$ Fe$_{bal.}$ Co$_{8.3}$ V$_{7.8}$ Si$_{5.6}$ Cu$_{0.6}$ | 94 |
| | R-rich Phase | Sm$_{69.7}$ Zr$_{0.5}$ V$_{0.1}$ Si$_{29.7}$ | 2.1 |
| | R(FeCo)$_2$ Phase | Sm$_{36.6}$ Zr$_{0.2}$ Fe$_{bal.}$ Co$_{8.4}$ V$_{0.3}$ Si$_{0.2}$ Cu$_{0.1}$ | 1.3 |
| | RCu$_2$ Phase | Sm$_{41.6}$ Fe$_{bal.}$ V$_{0.3}$ Si$_{0.2}$ Cu$_{64.6}$ | 0.4 |
| | ZrC Phase | Sm$_{3.3}$ Zr$_{51.9}$ Fe$_{bal.}$ C$_{38.6}$ | 0.2 |
| | Oxycarbide Phase | — | — |
| | R$_2$O$_3$ Phase | Sm$_{47.9}$ C$_{0.1}$ O$_{52.0}$ | 2 |
| Comparative Example 4 | Composition Analysis by EPMA Impossible | | |

The invention claimed is:

1. An anisotropic rare earth sintered magnet having a composition of a formula $(R_{1-a}Zr_a)_v(Fe_{1-b}CO_b)_{100-v-w-x-y}(M^1_{1-c}M^2_c)_wO_xC_y$ where R is one or more kinds selected from rare earth elements and indispensably includes Sm, $M^1$ is one or more kinds of elements selected from the group consisting of V, Cr, Mn, Ni, Ga, Al, and Si, $M^2$ is one or more kinds of elements selected from the group consisting of Ti, Nb, Mo, Hf, Ta, and W, and v, w, x, y, a, b, and c each satisfy 7≤v≤15 at %, 4≤w≤20 at %, 0.2≤x≤4 at %, 0.2≤y≤2 at %, 0≤a≤0.2, 0≤b≤0.5, and 0≤c≤0.9, which contains a main phase of a ThMn$_{12}$-type crystal compound in an amount of 80% by volume or more with the average crystal particle diameter of the main phase being 1 μm or more, which contains an R oxycarbide in the grain boundary area, and which has a density of 7.3 g/cm$^3$ or more, and the amount of the oxycarbide in the rare earth sintered magnet being 1.7% by volume or more, wherein the anisotropic rare earth sintered magnet does not comprise Cu and does not comprise Zn.

2. The anisotropic rare earth sintered magnet according to claim 1, wherein the oxycarbide is an oxycarbide of one or more kinds selected from the group consisting of an R(C,O) phase, an R(C,O)$_2$ phase, and an R$_2$(C,O)$_3$ phase.

3. The anisotropic rare earth sintered magnet according to claim 1, wherein in the composition of the sintered body, the proportion of Sm in R is 0.05 or more as an atomic ratio.

4. The anisotropic rare earth sintered magnet according to claim 1, wherein a two-intergranular grain boundary phase is formed between neighboring main phase grains.

5. The anisotropic rare earth sintered magnet according to claim 1, which shows a coercive force of 5 kOe or more at room temperature and in which the temperature coefficient β of the coercive force is −0.5%/K or more.

6. The anisotropic rare earth sintered magnet according to claim 1, which contains an $R_2(Fe,Co,M)_{17}$ phase, wherein an amount of formation of the $R_2(Fe,Co,M)_{17}$ phase is less than 1% by volume, where M is one or more kinds of elements selected from the group consisting of V, Cr, Mn, Ni, Ga, Al, Ti, Nb, Mo, Hf, Ta, and W.

7. The anisotropic rare earth sintered magnet according to claim 1, wherein the anisotropic rare earth sintered magnet comprises carbon by adding a carbon compound to raw materials for preparing an alloy for preparing the anisotropic rare earth sintered magnet, or by adding carbon compound to the alloy when grinding the alloy and not removing the carbon compound before sintering.

8. The anisotropic rare earth sintered magnet according to claim 1, wherein the anisotropic rare earth sintered magnet does not comprises $R_2(Fe,Co,M)_{17}$ phase.

9. The anisotropic rare earth sintered magnet according to claim 1, which contains an R-rich phase and an $R(Fe,Co)_2$ phase in the grain boundary area,
and in which the total amount of formation of the R-rich phase and the $R(Fe,Co)_2$ phase is 1% by volume or more.

10. The anisotropic rare earth sintered magnet according to claim 9, wherein the $R(Fe,Co)_2$ phase is a phase showing ferromagneticity or ferrimagneticity at room temperature or higher.

11. A method for producing an anisotropic rare earth sintered magnet of claim 1, comprising grinding an alloy that contains a $ThMn_{12}$-type crystal compound phase but does not contain an oxycarbide, then molding it in a mode of pressure powder molding with magnetic field application thereto to give a molded article, and thereafter sintering it at a temperature of 800° C. or higher and 1400° C. or lower to form an oxycarbide in the grain boundary area.

12. The method for producing an anisotropic rare earth sintered magnet according to claim 11, comprising heat treatment at a temperature of 300 to 900° C. after the sintering.

* * * * *